United States Patent
Furutani et al.

(10) Patent No.: US 8,537,217 B2
(45) Date of Patent: Sep. 17, 2013

(54) IMAGE PHOTOGRAPHING APPARATUS, METHOD OF CONTROLLING IMAGE PHOTOGRAPHING APPARATUS AND CONTROL PROGRAM

(75) Inventors: Masahiro Furutani, Kanagawa (JP); Takashi Yamamoto, Tokyo (JP); Kenji Ohmori, Kanagawa (JP)

(73) Assignee: Sony Mobile Communications, Inc., Tokyo (JP)

( * ) Notice: Subject to any disclaimer, the term of this patent is extended or adjusted under 35 U.S.C. 154(b) by 839 days.

(21) Appl. No.: 12/695,224

(22) Filed: Jan. 28, 2010

(65) Prior Publication Data

US 2010/0194880 A1      Aug. 5, 2010

(30) Foreign Application Priority Data

Feb. 5, 2009  (JP) ............................... P2009-025434

(51) Int. Cl.
*H04N 7/18* (2006.01)
(52) U.S. Cl.
USPC .......................................................... 348/135
(58) Field of Classification Search
USPC ........................................ 348/135–166, 240
IPC ....................................................... H04N 7/18
See application file for complete search history.

(56) References Cited

U.S. PATENT DOCUMENTS

| | | | |
|---|---|---|---|
| 5,252,950 A * | 10/1993 | Saunders et al. | 345/9 |
| 5,398,095 A | 3/1995 | Tsukamoto et al. | |
| 7,016,704 B2 * | 3/2006 | Pallakoff | 455/566 |
| 7,609,955 B2 * | 10/2009 | Motomura et al. | 396/77 |
| 7,769,632 B2 * | 8/2010 | Giraud et al. | 705/14.4 |
| 2002/0151283 A1 * | 10/2002 | Pallakoff | 455/90 |
| 2007/0053680 A1 | 3/2007 | Fromm | |
| 2008/0049020 A1 | 2/2008 | Gusler et al. | |
| 2008/0193119 A1 | 8/2008 | Miyazaki | |
| 2010/0134642 A1 * | 6/2010 | Thorn | 348/222.1 |

FOREIGN PATENT DOCUMENTS

| | | |
|---|---|---|
| CN | 1607453 | 4/2005 |
| JP | 63 220118 | 9/1988 |
| JP | 2005 110162 | 4/2005 |
| JP | 2005 121838 | 5/2005 |
| JP | 2006 121344 | 5/2006 |
| JP | 2007 324976 | 12/2007 |
| JP | 2008 113310 | 5/2008 |

* cited by examiner

*Primary Examiner* — Tung Vo
(74) *Attorney, Agent, or Firm* — Frommer Lawrence & Haug LLP; William S. Frommer

(57) ABSTRACT

An image photographing apparatus is provided, which includes a camera section having a zoom function for changing a photographing field angle, a transmissive display section including a display surface that allows sides facing each other to be transmissively viewed from both directions of a housing front side and a housing back side, a distance detection section that detects a distance from a point of view of a photographer to the display surface of the display section, and a control section. The control section controls the display surface of the transmissive display section in a transmissively viewable state when in photographing mode so as to perform photographing by the camera section, and determines a photographing field angle using the zoom function of the camera section in response to the distance detected by the distance detection section.

11 Claims, 10 Drawing Sheets

IMAGE PHOTOGRAPHING APPARATUS, METHOD OF CONTROLLING IMAGE PHOTOGRAPHING APPARATUS AND CONTROL PROGRAM

BACKGROUND OF THE INVENTION

1. Field of the Invention

The present invention relates to an image photographing apparatus including an image capturing device and a display device, a method of controlling the image photographing apparatus, and a control program.

2. Description of the Related Art

In Japanese Unexamined Patent Application Publication No. 2006-121344 (FIG. 1), there is disclosed a digital single-lens reflex camera which retreats a movable mirror from a photographing light-path, continuously captures subject images in a state where a focal plane shutter is opened, and displays the image on a monitor screen. In addition, in the digital single-lens camera described in Japanese Unexamined Patent Application Publication No. 2006-121344 (FIG. 1), when a photographer does not look into a finder eyepiece and manually operates a focus regulating operation member, the electronic viewfinder function is operated. Therefore, according to the digital single-lens reflex camera described in Japanese Unexamined Patent Application Publication No. 2006-121344 (FIG. 1), it is possible to easily perform the operation and to suppress an increase in power consumption.

Meanwhile, a digital camera, including a general backlight-fitted liquid crystal display device or a camera mounted on a cellular phone terminal, functions to capture image data output from an image capturing device, delivers the image data to a memory of a display device and makes it able to be displayed. That is, in the digital camera and the camera-equipped cellular phone terminal according to the related art, the display device is used as a so-called electronic viewfinder. Therefore, for example, even in a draft state when the photographing is actually not performed such as when a photographing angle is being determined, data reading/writing processes and image display processes are frequently executed. Therefore, in the digital camera and the cellular phone terminal, power consumption increases even in the draft state, so that the battery may be exhausted.

In addition, in the digital camera and the cellular phone terminal according to the related art, it takes a time to some degree from capturing by the image capturing device to updating the image data in the memory for the display device. For this reason, for example, when a moving photographic subject is photographed or when the photographer moves (that is, the camera moves), the image (image on the electronic viewfinder) on the screen of the display device is displayed with a delay compared with the real-world entity. In particular, when the photographing is performed under a low luminance environment, an exposure time of the photographing device is elongated and the output frame rate is slower. Therefore, the display image on the display device looks likes a moving image in which so-called frame omission occurs, and the movement of the subject image is often awkward and feels uncomfortable. In general, since the photographer determines timing for releasing the shutter while looking at the image on the display device, when the frame omission occurs in the display image as described above, it is difficult to release the shutter at a proper timing. As a result, a chance for a picture may be missed.

Further, the above problem hardly occurs in the film camera according to the related art in which the real-world entity can be directly confirmed via an optical finder, but becomes a special problem in the recent camera function of the digital camera or the cellular phone terminal. Of course, when the optical finder is provided at the digital camera or the cellular phone terminal so as to directly confirm the real-world entity by the photographer, the above-mentioned problem hardly occurs. However, in a case of the cellular phone terminal which is limited in housing volume capacity, it is not preferable to also provide the device such as the optical finder.

In addition, for example, when the capturing sensitivity of the image capturing device is increased or the light-gathering capability of the camera optical system is increased, a decrease in the above-mentioned output frame rate can be suppressed to some degree. However, when the highly-sensitive photographing device or the camera optical system with high light-gathering capability is provided, the cost is increased and the size is increased, which is not preferable. In addition, an uncomfortable feeling due to the display image on the display device may be reduced to some degree by using a CPU with image processing capability or by using a memory corresponding to a high-speed read/write operation. However, when the high-performance CPU or the memory corresponding to the high-speed read/write operation is mounted, the cost is increased and the power consumption is also increased.

Besides, a large number of digital cameras or a portion of camera-equipped cellular phone terminals are provided with a zoom function through which the photographing field angle is changeable, and the photographer performs the zoom operation while looking at the display image on the display device, so that the photographing is performed at a desired field angle. Then, the zoom operation is performed using a zoom-up/zoom-down button provided on the housing, or a zoom switch of a seesaw type. However, mounting locations of these buttons or the switches, operations of these buttons, the operation of the camera, and direction assignment of the zoom-up/zoom-down are different according to the types of cameras, so that it is difficult for these assignments to be distinguished to the photographer. For this reason, for example, the photographer may want to push the zoom-up button, but may mistakenly push the zoom-down button.

SUMMARY OF THE INVENTION

The present invention provides an image photographing apparatus, a method of controlling the image photographing apparatus, and a control program which are capable of suppressing power consumption when in photographing mode, capable of allowing a photographer to perform photographing while confirms an entity of the real world directly without involving higher costs or increased size, and capable of allowing the photographer to positively determine the photographing field angle without any erroneous operations.

According to an embodiment of the present invention, there is provided an image photographing apparatus including a camera section having a zoom function for changing a photographing field angle, a transmissive display section including a display surface that allows sides facing each other to be transmissively viewed from both directions of a housing front side and a housing back side, a distance detection section that detects a distance from a point of view of a photographer to the display surface of the display section, and a control section. The control section controls the display surface of the transmissive display section in a transmissively viewable state when in photographing mode so as to perform photographing by the camera section, and determines a photographing field angle using the zoom function of the camera section in response to the distance detected by the distance detection section. Herewith, the present invention solves the problem mentioned above.

That is, according to the present invention, when in photographing mode, the display surface of the transmissive display section is set to be in a transmissively viewable state and is used as an optical finder to thereby reduce power for displaying a photographed image on the transmissive display section. Further, when in photographing mode, the photographing field angle using a zoom function of the camera section is determined in response to the distance which the distance detection section detects. In other words, the photographing field angle using the zoom function of the camera section is determined so as to fit a viewing angle (finder field angle) as viewed through the display surface of the transmissive display section by the photographer. Herewith, it is possible to fit the viewing angle (finder field angle) and the photographing field angle.

In the present invention, when in photographing mode, the display surface of the transmissive display section is set to be in a transmissively viewable state and is used as an optical finder, so that power consumption when in photographing mode is suppressed, and the photographer can perform photographing while confirming an entity of the real world directly without involving higher costs or increased size. Further, in the present invention, since the photographing field angle using the zoom function of the camera section is determined in response to the distance which the distance detection section detects, the photographer is able to positively determine the photographing field angle without any erroneous operation by an intuitive operation for changing the distance from the point of view of the photographer to the display surface of the display section.

DESCRIPTION OF THE PREFERRED EMBODIMENTS

Hereinafter, reference is made to the drawings to describe an embodiment of the present invention.

An example to which the present invention is applied includes a camera-equipped cellular phone terminal in the present embodiment. Of course, the content to be described here is only an example, and it goes without saying that the invention is not limited to this example.

Schematic Appearance Configuration of Cellular Phone Terminal

Figure 1:
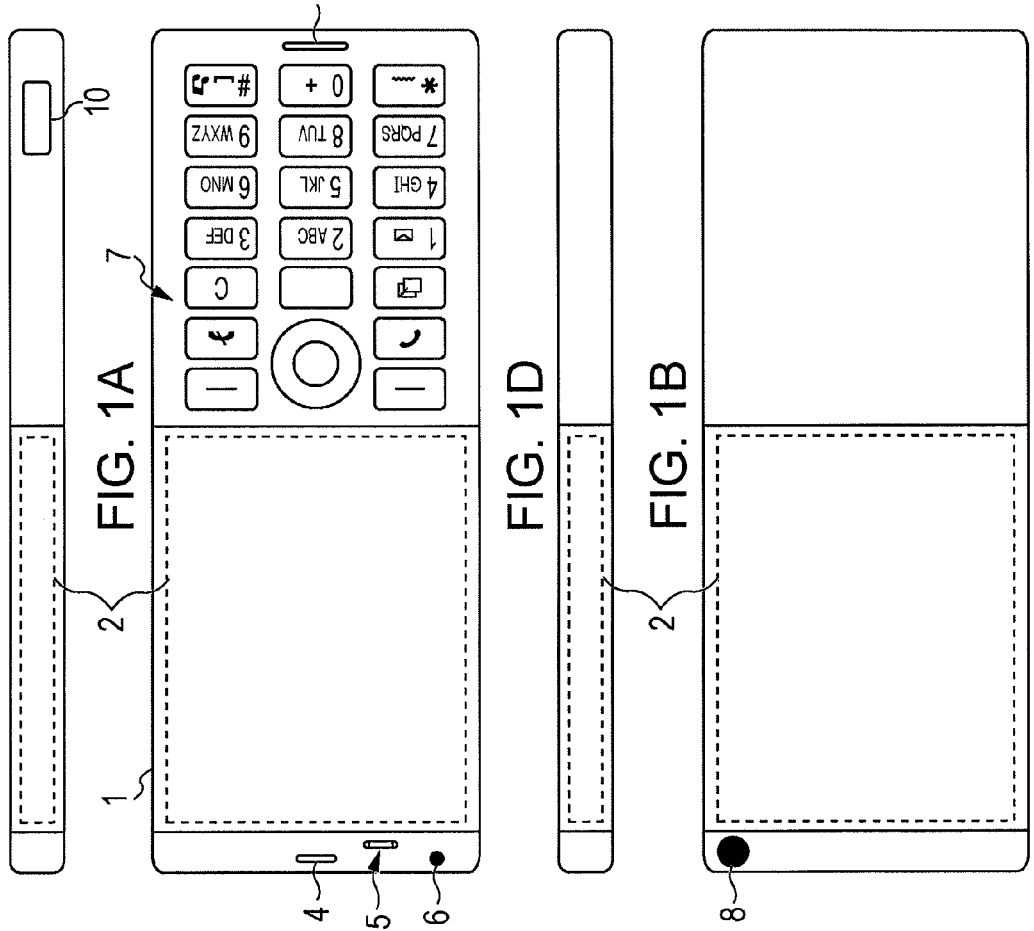
FIGS. 1A to 1F are a diagram schematically showing an appearance configuration example of a cellular phone terminal according to an embodiment of the present invention.

FIG. 1 shows a schematic appearance configuration example of a cellular phone terminal 1 according to this embodiment. FIG. 1A shows a schematic front view of the cellular phone terminal 1 according to the embodiment, FIG. 1B shows a schematic side view, and FIGS. 1C to 1F show schematic side views with respect to the front view of FIG. 1A, respectively. Meanwhile, each of the devices to which referential marks are attached in FIG. 1 is a portion of all devices that the cellular phone terminal 1 includes. The cellular phone terminal 1 according to the embodiment naturally includes various types of devices (not shown in FIG. 1) which a typical high-functioning cellular phone terminal includes.

In the cellular phone terminal 1 according to the embodiment as shown in FIG. 1, on the housing front side shown in FIG. 1A of the drawings are disposed a key device portion 7 composed of key buttons such as a numeric keypad, Send/End keys, cross keys, a clear key, and an e-mail key, a receiving speaker (receiver) 4, a sending microphone 3, a sub-camera device (in-camera) lens 6, a distance sensor 5 described later, a liquid crystal display device 2 described later and the like.

Further, in the cellular phone terminal 1 according to the embodiment, a main camera device lens 8 is on the housing back side shown in FIG. 1B, an interface connector 9 is provided on the housing lateral side shown in FIG. 1F, and a shutter button 10 is provided on the housing lateral side shown in FIG. 1C.

Meanwhile, the key device portion 7, the receiving speaker (receiver) 4, the sending microphone 3, the interface connector 9 and the like are the same as those mounted in general cellular phone terminals, therefore the descriptions thereof will be omitted here.

Here, in the cellular phone terminal 1 according to the embodiment, the main camera device is a camera device which is chiefly used when photographing is performed. Photographing through the main camera device is performed in response to, for example, holding-down of the shutter button 10, or, in the case where which a predetermined key of the key device portion 7 is allocated as a shutter button, holding-down of such a predetermined key.

The above-mentioned sub-camera device is a camera device that is chiefly used, for example, to photograph a calling party's own self during a call through a so-called TV telephone, or to perform a so-called self-shoot and the like. The photographing through the sub-camera device is performed, for example, in the case where which a predetermined key of the key device portion 7 is allocated as a shutter button, in response to holding-down of such a predetermined key. Meanwhile, the photographing through the sub-camera device may be performed in response to holding-down of the shutter button 10. In addition, the sub-camera device can be naturally used for typical photographing other than a self-shoot as well. In the case of the cellular phone terminal 1 according to the embodiment, it is possible to perform a call through the TV telephone or photographing for a self-shoot even by the main camera device.

The liquid crystal display device 2 mounted on the cellular phone terminal 1 according to the embodiment includes a function capable of controlling a display surface so as to be capable of transmissively viewing the sides facing each other from both directions of the housing front side and the housing back side, in addition to a function to display images, characters or symbols and the like on the display surface. To be concretely described, the liquid crystal display device 2 mounted on the cellular phone terminal 1 according to the embodiment includes a structure where a large number of liquid crystal molecules are interposed between two sheets of transparent plates, and one of these two sheets of transparent plates is disposed in the housing front side of FIG. 1A and the other in the housing back side of FIG. 1B with both plates able to be seen from the outside. The liquid crystal display device 2 allows images, characters or symbols and the like to be displayed by controlling orientation of axes of the liquid crystal molecules in the light scattering direction. On the other hand, the orientation of the axes of the liquid crystal molecules is controlled in the direction in which the light is transmitted in both the housing front side of FIG. 1A and the housing back side of FIG. 1B, thereby allowing the sides facing each other to be transmissively viewed from both directions of the above-mentioned housing front side and the housing back side.

Although a detailed description will be given later, in the case of the embodiment, in the transmissive liquid crystal display device 2 mentioned above, a predetermined area of the display surface (substantially whole surface as an example) is constituted so as to allow the sides facing each other to be transmissively viewed from both directions of the mentioned-above housing front side and the housing back side in a draft state where the photographing is not actually performed similar to in the photographing mode, for example, the determination of a photographing angle.

That is, in the cellular phone terminal 1 according to the embodiment, the substantially whole surface of the display surface of the mentioned-above transmissive liquid crystal display device 2 becomes the transmissively viewable transmissive area in the photographing mode, so that a photographer is able to be in visual contact with entities of the real-world through the transmissive area similar to a so-called optical finder.

As describe above, in the cellular phone terminal 1 according to the embodiment, since the transmissive liquid crystal display device 2 is capable of being used similar to the optical finder in the photographing mode, the liquid crystal display device is used as an electronic viewfinder similar to digital cameras of the related art or camera-equipped cellular phone terminals of the related art, and captured images of the camera are not necessary to be displayed on the screen of the display device. That is, in the digital cameras of the related art, it is necessary to perform processing for delivering captured image data from the camera device to a memory in the display device and displaying the data, for example, even in the draft state and the like, therefore a significant amount of power has been consumed. However, in the case of the cellular phone terminal 1 according to the embodiment, it is not necessary to perform processing for delivering to the memory or displaying these image data and the like. Therefore, with the cellular phone terminal 1 according to the embodiment, it is possible to drastically reduce the power consumption, and to suppress the dissipation of the battery.

Further, in the cellular phone terminal 1 according to the embodiment, since it is not necessary to perform processing for delivering the captured image data from the camera device to the memory of the display device and displaying the data as described above, a problem does not occur that images on the electronic viewfinder are displayed with a delay compared to entities of the real world similar to the digital cameras of the related art. Therefore, with the cellular phone terminal 1 according to the embodiment, a photographer is able to click the shutter at an appropriate timing without missing the actual movement of a photographic subject which is an entity, for example, regardless of whether to photograph in the low-luminance circumstances, and to take a photograph in which the chance is exactly captured. In addition, with the cellular phone terminal 1 according to the embodiment, since it is not necessary to provide a camera optical system having, for example, a highly-sensitive image capturing device or the high light-gathering capability similar to the digital cameras of the related art, and also to deal with delay of images on the electronic viewfinder by mounting a high-performance CPU or memory, there is no higher costs or increased size.

In the cellular phone terminal 1 according to the embodiment, since the transmissive liquid crystal display device, for example, used as a typical display device in the cases of calling or reading and writing E-mails and the like is used as an optical finder in the case of photographing mode, it is not necessary to provide an additional new optical finder, thereby allowing higher costs and increased size to be suppressed.

Meanwhile, on the display surface of the transmissive liquid crystal display device 2 in the above-mentioned photographing mode, it is possible to display various types of photographing auxiliary information such as, for example, shutter speed, exposure value, the number of photographing coma, resolution, and a tele/wide index of zoom in the range not disturbing a function as the above-mentioned optical finder. However, in the case where the typical photographing is performed using the main camera device, when a photographer is viewing an entity of the real world from FIG. 1A side through the above-mentioned transmissive liquid crystal display device 2, the above-mentioned photographing auxiliary information is composed of characters or symbols confronted as viewed from FIG. 1A side and is displayed on the display surface of the transmissive liquid crystal display device 2. Similarly, in the case where a TV telephone call or a self-shoot, for example, is performed using the sub-camera device, when the photographer is viewing FIG. 1A side, the photographing auxiliary information is composed of characters or symbols confronted as viewed from FIG. 1A side and is displayed on the display surface of the transmissive liquid crystal display device 2. On the other hand, in the case where the typical photographing, for example, is performed using the sub-camera device, when the photographer is viewing an entity of the real world from FIG. 1B side through the transmissive liquid crystal display device 2, the photographing auxiliary information is composed of characters or symbols confronted as viewed from FIG. 1B side and is displayed on the display surface of the transmissive liquid crystal display device 2. Similarly, as in the case where a TV telephone call or a self-shoot, for example, is performed using the main camera device, when the photographer is viewing FIG. 1B side, the photographing auxiliary information is composed of characters or symbols confronted as viewed from FIG. 1B side and is displayed on the display surface of the transmissive liquid crystal display device 2. In addition, it is possible to automatically perform processing of switching the display of characters and the like of the photographing auxiliary information as described above in accordance with the direction where the photographer is viewing, for example, in response to input of instructions from the photographer through the key device portion 7, or in response to a detection result of a face and the like photographed by either camera device. Meanwhile, automatic display switching control may include control such as displaying the photographing auxiliary information of the characters confronted as mentioned above on the side of the display surface identical to a lens mounting surface of the camera device of the side in which a face of the photographer is detected, for example, when the face of the photographer is detected from the captured image of the camera device of either one of the main and sub cameras. With exception of these cases, in the embodiment, since it is not necessary for this photographing auxiliary information to be frequently updated, and may be updated only when the contents of the information are changed, the power consumption for displaying the information on the transmissive liquid crystal display device 2 is very low.

The distance sensor 5 mounted in the cellular phone terminal 1 according to the embodiment is constituted by, for example, an ultrasonic sensor or a light position sensor (PSD: Position Sensitive Detector). Meanwhile, the ultrasonic sensor emits ultrasonic waves, and measures the arrival time of reflected waves of which the ultrasonic waves are reflected from an object, to thereby detect a distance up to the object. In addition, the light position sensor emits light, and measures an incidence angle of reflected light of which the light is reflected from the object, to thereby detect a distance up to the object. A detailed description will be given of an application of the distance sensor 5 later.

Change in Field Angle upon Zooming Up and Down

The main camera device of the cellular phone terminal 1 according to the embodiment includes a zoom function capable of changing the photographing field angle. The zoom function is achieved by either of a so-called optical method or electronic method or a combination thereof. Meanwhile, the change in the photographing field angle by the optical zoom function is achieved by moving a portion of lenses among a plurality of lenses which constitutes the photographing optical system in the direction of the optical axis. When having the optical zoom function, the main camera device includes an actuator for moving the portion of lenses in the direction of the optical axis. The cellular phone terminal 1 according to the embodiment drives the actuator electrically, so that the cellular phone terminal moves the portion of lenses in the direction of the optical axis to thereby obtain the desired photographing field angle. On the other hand, the change in the photographing field angle by the electronic zoom function is achieved by changing a use area centered on the optical axis portion in the captured surface of the image capturing device.

Meanwhile, when the transmissive liquid crystal display device 2 is used as the optical finder as described above, the range of the real world with which the photographer can have visual contact varies significantly due to the distance from the point of view of the photographer 70 (position of an eye 71) to the finder (distance up to the display surface of the transmissive liquid crystal display device 2), for example, as shown in FIG. 2 to FIG. 5.

Figure 2:
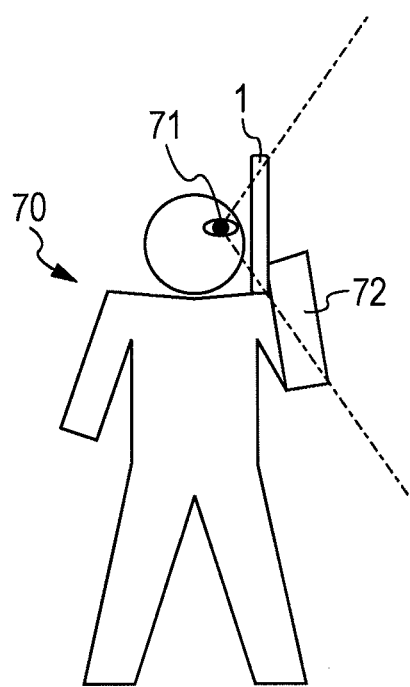
FIG. 2 is a diagram used for describing a viewing angle (finder field angle) visible through an optical finder, when a photographer bends his/her arm to bring a cellular phone terminal close to his/her eyes and views the real world through a transmissive liquid crystal display device which is the optical finder.
Figure 3:
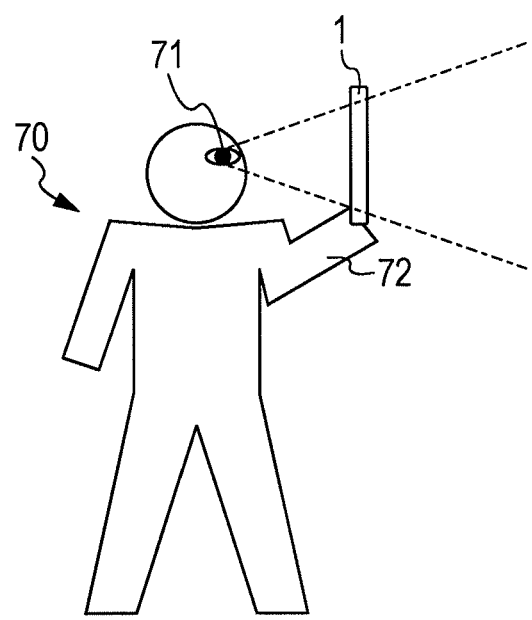
FIG. 3 is a diagram used for describing a viewing angle (finder field angle) visible through the optical finder, when the photographer stretches his/her arm to keep the cellular phone terminal away and views the real world through the transmissive liquid crystal display device which is the optical finder.
Figure 4:
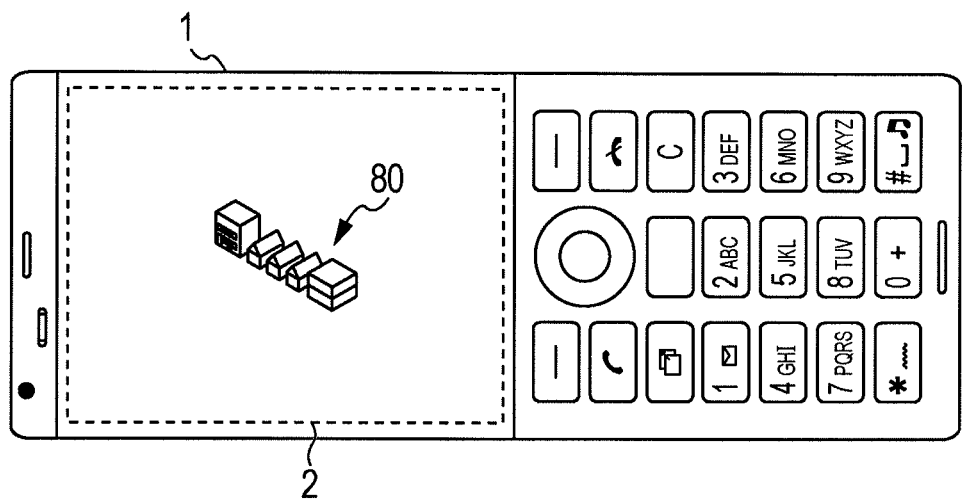
FIG. 4 is a diagram used for describing the real-world range which the photographer is able to have visual contact with in an example of FIG. 2.
Figure 5:
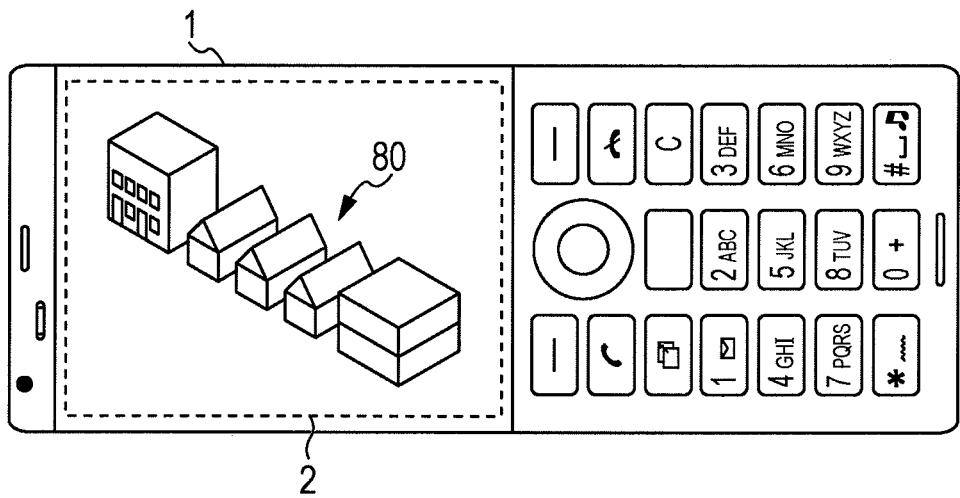
FIG. 5 is a diagram used for describing the real-world range which the photographer is able to have visual contact with in an example of FIG. 3.

That is, for example, as shown in FIG. 2, when the photographer 70 bends his/her arm 72 to bring the cellular phone terminal 1 close to his/her eye 71, and views the real world through the transmissive liquid crystal display device 2 which is the optical finder, the range with which the photographer 70 can have visual contact through the transmissive liquid crystal display device 2, in other words, the viewing angle (finder field angle) visible from the point of view of the photographer 70 through the optical finder becomes wider. On the other hand, for example, as shown in FIG. 3, when the photographer 70 stretches his/her arm 72 to keep the cellular phone terminal 1 away from his/her eye 71, and views the real world through the transmissive liquid crystal display device 2 which is the optical finder, the range (finder field angle) with which the photographer 70 can have visual contact through the transmissive liquid crystal display device 2 becomes narrower. In the cases of examples as shown in FIG. 2 and FIG. 3, the sizes of the real world visible from a transmissive area of the transmissive liquid crystal display device 2 which is the optical finder are shown in FIG. 4 and FIG. 5 as an example. In other words, in the case of the example of FIG. 2, the range of the real world with which the photographer 70 can have visual contact becomes wider as shown in FIG. 4. On the other hand, in the case of the example of FIG. 3, the range of the real world with which the photographer 70 can have visual contact becomes narrower as shown in FIG. 5. Meanwhile, in the examples of FIG. 4 and FIG. 5, although the fact that the ranges of the real world with which the photographer 70 can have visual contact are different from each other is represented by altering the size of a certain photographic subject 80 within the real world, the size itself of the photographic subject 80 does not, of course, vary. In the examples of FIG. 4 and FIG. 5, by relatively altering the size of the same photographic subject 80 with respect to the range visible through the transmissive liquid crystal display device 2, there are represented differences in the ranges of the real world (finder field angles) with which the photographer 70 can have visual contact in the examples of FIG. 2 and FIG. 3.

Figure 6:
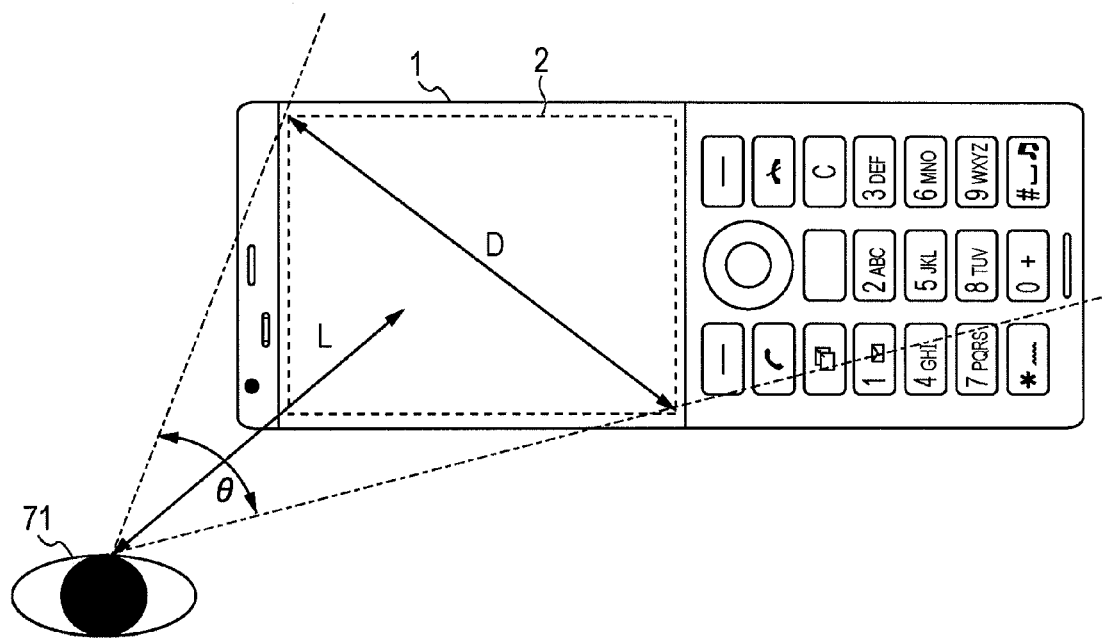
FIG. 6 is a diagram used for describing the relationship among a distance from a point of view of the photographer to the transmissive liquid crystal display device, a diagonal size of the light-transmissive liquid crystal display device, and a diagonal angle of view of the optical finder.

Here, in the case where the transmissive liquid crystal display device 2 is used as the optical finder as described above, the relationship between a distance L from the point of view of the photographer 70 (position of the eye 71) to the optical finder (distance up to the display surface of the transmissive liquid crystal display device 2) as shown in FIG. 6, a diagonal size D of the transmissive liquid crystal display device 2, and a diagonal angle of view θ of the optical finder can be represented by the following formula.

$$\theta = 2 \cdot \tan^{-1}(D/2L)$$

In this formula, the diagonal size D of the transmissive liquid crystal display device 2 is a known value. Therefore, when the distance L from the point of view to the display section is determined, it is possible to calculate the diagonal angle of view θ of the optical finder.

Furthermore, in the case of the photographing through the main camera device, when the diagonal angle of view θ of the optical finder is determined, it is determined that how much photographing field angle the photographing is performed by the photographer 70. And then, when the photographing field angle in the zoom function of the cellular phone terminal 1 according to the embodiment is controlled so as to be fitted to the diagonal angle of view θ of the optical finder, it is possible to photograph the range of the real world that the photographer 70 is viewing through the optical finder.

In the cellular phone terminal 1 according to the embodiment, the distance L from the photographer 70 to the optical finder is obtained by, for example, a distance sensor 5.

In addition, it is possible to obtain the distance L by a method of, for example, recognizing the face of the photographer 70 through the sub-camera device, for example, obtaining the size of the face from a position relationship and the like of both eyes, and extrapolating on the basis of the size of the face. In this case, for example, the method previously prepares a correspondence relationship between a plurality of values indicative of the size of the face and values indicative of a plurality of distances L, obtains the size of the face from a facial image photographed by the above-mentioned sub-camera device, and extrapolates the distance L from the size of the face. The size of the face alters in accordance with, for example, sex, race, age (adult and child) and the like, but recent facial recognition technology is capable of recognizing even sex, race, and age group from the facial image. Therefore, when a correspondence relationship between the facial sizes for each sex, race, and age group thereof and the distance L is previously prepared, it is possible to obtain the distance L in response to sex, race, and age group acquired by the facial recognition technology.

In addition, when the facial recognition of the photographer 70 is performed by the sub-camera device, it is possible to also discriminate whether the photographer 70 photographs while viewing the photographic subject and the like through the optical finder, or whether the photographer 70 photographs while not viewing the optical finder. That is, it is determined that whether the face of the photographer 70 is confronted with the sub-camera device side (in other words, finder side) by the facial recognition. In the case of confrontation, it is determined that the photographer 70 views the optical finder. On the other hand, in the case of non-confrontation, it is possible to determine that the photographer 70 does not view the optical finder. Meanwhile, a photographing example of not viewing the optical finder may include, for example, an example and the like of photographing (so-called no-finder photographing) the photographic subject located at the position higher or reversely lower than the eyes of the photographer 70.

In the cellular phone terminal 1 according to the embodiment, when it is determined that the photographer 70 photographs while viewing the optical finder, the transmissive liquid crystal display device 2 is made transmissive to thereby function as the optical finder, and the zoom function is controlled in response to the distance L from the photographer 70 to the optical finder.

On the other hand, when the photographer 70 photograph while viewing the optical finder, the range of the real world visible beyond the finder and the range of the real world photographed through the main camera device are different from each other. For this reason, when the cellular phone terminal 1 according to the embodiment determines that the photographer 70 photographs without viewing the optical finder, the cellular phone terminal 1 display images captured through the main camera device on the display surface of the transmissive liquid crystal display device 2, and switches the zoom to, for example, a photographing interface of general cameras performing the zooming in response to arbitrary key operations allocated to the key device portion 7.

That is, the cellular phone terminal 1 according to the embodiment is capable of automatically switching between an automatic zoom mode for automatically controlling the zoom function in response to the distance L from the photographer 70 to the optical finder along with making the transmissive liquid crystal display device 2 transmissive, and a manual zoom mode for performing the zooming by the key operation along with displaying images of the main camera device on the transmissive liquid crystal display device 2, in accordance with a result of the facial recognition of the photographer 70. Of course, in the cellular phone terminal 1 according to the embodiment, the photographer 70 is also able to arbitrarily select the automatic zoom mode and the manual zoom mode through, for example, a menu selection and the like.

In the case where the cellular phone terminal 1 according to the embodiment is in the automatic zoom mode, for example, when it is determined that the photographer 70 is not confronted with the optical finder side by the above-mentioned facial recognition, notification urging an operator 70 to take precautions so as to be confronted with the optical finder may be performed. The notification may be performed by a notice sound, a display on the transmissive liquid crystal display device 2, vibration of a vibrator and the like.

Control of Transmissive Area of Transmissive Liquid Crystal Display Device

In the description mentioned above, the example has been given that an aspect ratio of the photographed image which is obtained by the main camera device, and an aspect ratio of the display surface of the transmissive liquid crystal display device 2 are substantially identical with each other. However, in the case where both of these aspect ratios are different from each other, the aspect ratio of the transmissive area of the transmissive liquid crystal display device 2 is controlled so as to be fitted to the aspect ratio of the photographed image, for example, as shown in FIG. 7.

Figure 7:
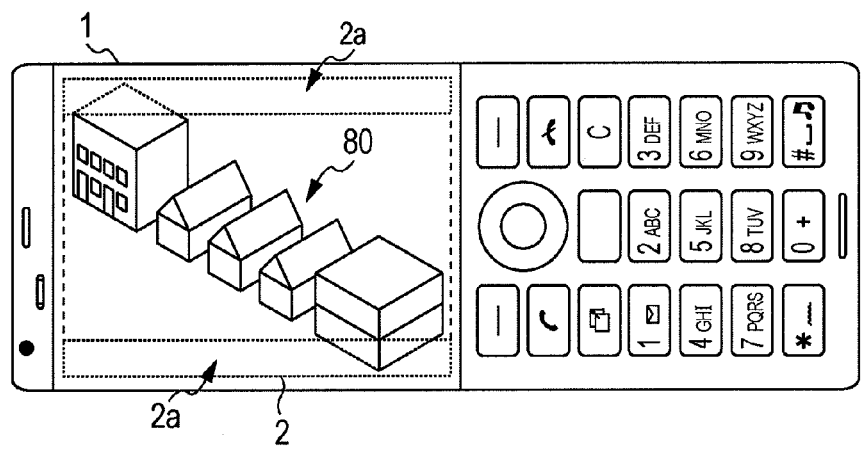
FIG. 7 is a diagram showing a state where an aspect ratio of a display surface of the transmissive liquid crystal display device is controlled so as to fit an aspect ratio of a photographed image which is obtained by a main camera device.

In an example of FIG. 7, the example is given that the aspect ratio of the image photographed through the main camera device is 16:9, and the aspect ratio of the display surface of the transmissive liquid crystal display device is 4:3. In this case, as shown in FIG. 7, the cellular phone terminal 1 according to the embodiment fits the aspect ratio of the transmissive area which is made transmissive in the display surface of the transmissive liquid crystal display device 2 to 16:9 which is the aspect ratio of the photographed image. That is, as shown in FIG. 7, a portion of the display surface of the transmissive liquid crystal display device 2 (up and down portions in the example of FIG. 7) is set to be an opaque state 2a, to thereby fit the aspect ratio.

Further, as in the embodiment, when the transmissive liquid crystal display device is used as the optical finder, for example, when the point of view of the photographer 70 approaches the finder conspicuously, there may occur the possibility that a field angle θ of the finder (the range of the real world visible beyond the finder) becomes larger than a maximum field angle θ cam caused by the zoom function of the cellular phone terminal 1 of the main camera device.

Figure 8:
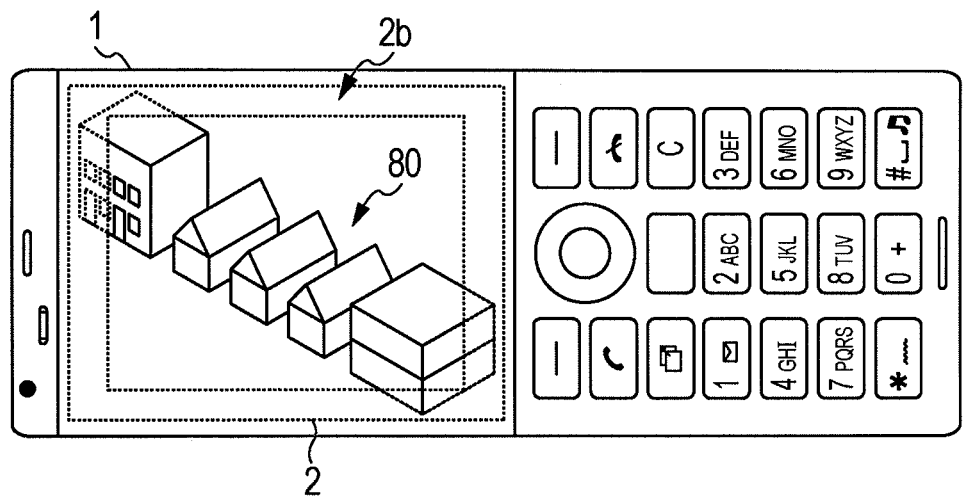
FIG. 8 is a diagram used for describing a transmissive area of the transmissive liquid crystal display device when a finder field angle and a maximum field angle of the main camera device are fitted.

For this reason, as a result of measurement of the distance L from the photographer 70 to the optical finder as described above, when the relationship between the maximum field angle θ cam and the finder field angle θ is θ cam<θ, the cellular phone terminal 1 according to the embodiment changes the size of the transmissive area of the transmissive liquid crystal display device 2 so as for the finder field angle θ to be fitted to the maximum field angle θ cam, as shown in FIG. 8. That is, in an example of FIG. 8, a portion of the display surface of the transmissive liquid crystal display device 2 (periphery portion except for a central portion in the example of FIG. 8) is set to be an opaque state 2b to thereby fit the finder field angle θ to the maximum field angle θ cam. Herewith, for example, even though the point of view of the photographer 70 approaches the finder conspicuously, the real world equal to or more than the maximum field angle θ cam is not visible beyond the optical finder.

Further, as in the embodiment, when the transmissive liquid crystal display device 2 is used as the optical finder, it is not possible to confirm that, for example, what is the focus state by the main camera device like, in other words, whether or not the focus is taken.

Figure 9:
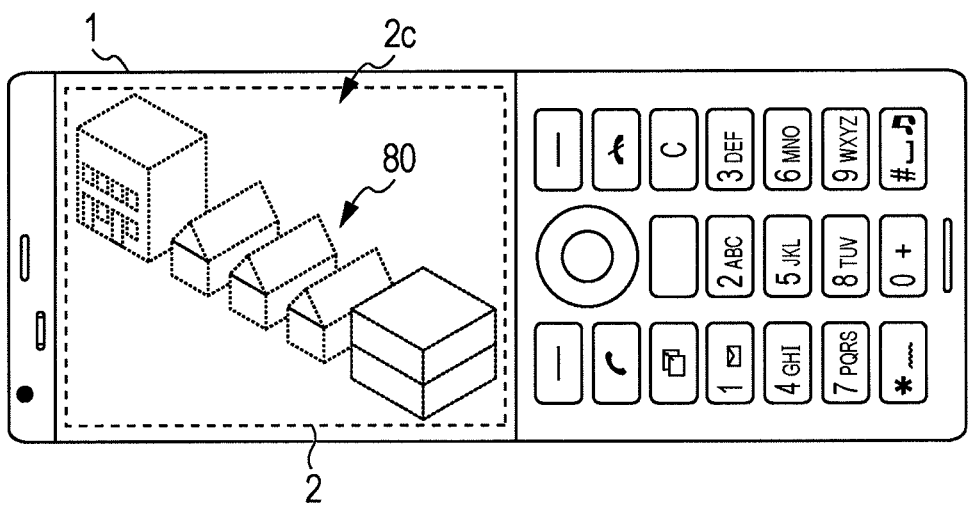
FIG. 9 is a diagram showing a display example when out of focus during photographing through the main camera device.
Figure 10:
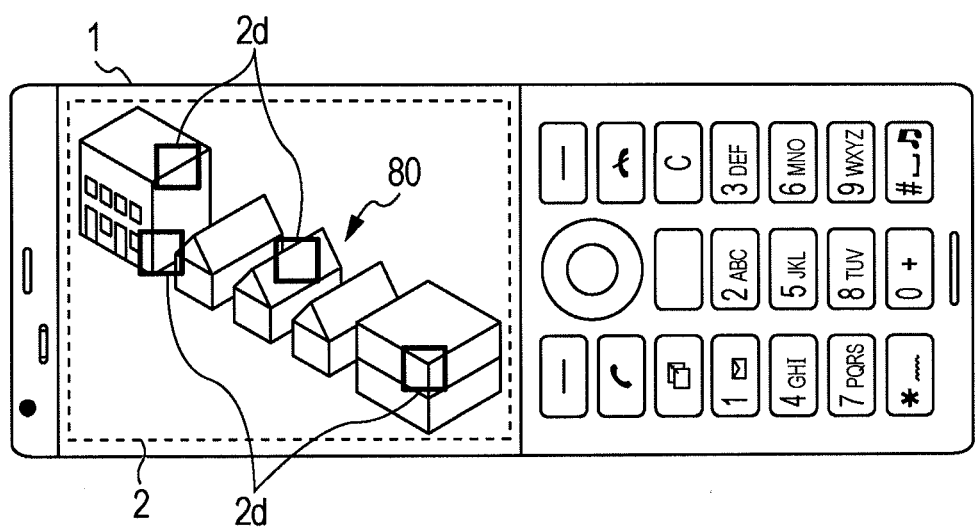
FIG. 10 is a diagram showing a display example when in focus during photographing through the main camera device.

For this reason, when the focus is not taken at time of photographing through the main camera device (focusing failure), for example, as shown in FIG. 9, the cellular phone terminal 1 according to the embodiment lowers transparency of the whole surface 2c of the transmissive liquid crystal display device 2, in other words, transparency of the whole optical finder, and notifies the photographer 70 that the focus is taken. Further, when the focus is taken at time of photographing by the main camera device (focusing success), for example, as shown in FIG. 10, the cellular phone terminal 1 according to the embodiment displays images of, for example, edge frames 2d and the like on the portions corresponding to focusing points in the display surface of the transmissive liquid crystal display device 2, and notifies the photographer 70 that the focus is taken and in which portion the focus is taken.

Meanwhile, the method of performing zoom processing in response to the change in the distance L due to bending and stretching operations of the arm 72 of the photographer 70, as described above, is capable of being implemented even in the cellular phone terminals or the digital cameras including the general display devices which do not have the transmissive liquid crystal display device 2 such as the cellular phone terminal 1 according to the embodiment. However, it is not possible to expect effects of power saving or effects of handling for the image delay and the like such as the embodiment in the cellular phone terminals or the digital cameras including these general display devices.

Schematic Configuration of Cellular Phone Terminal

Figure 11:
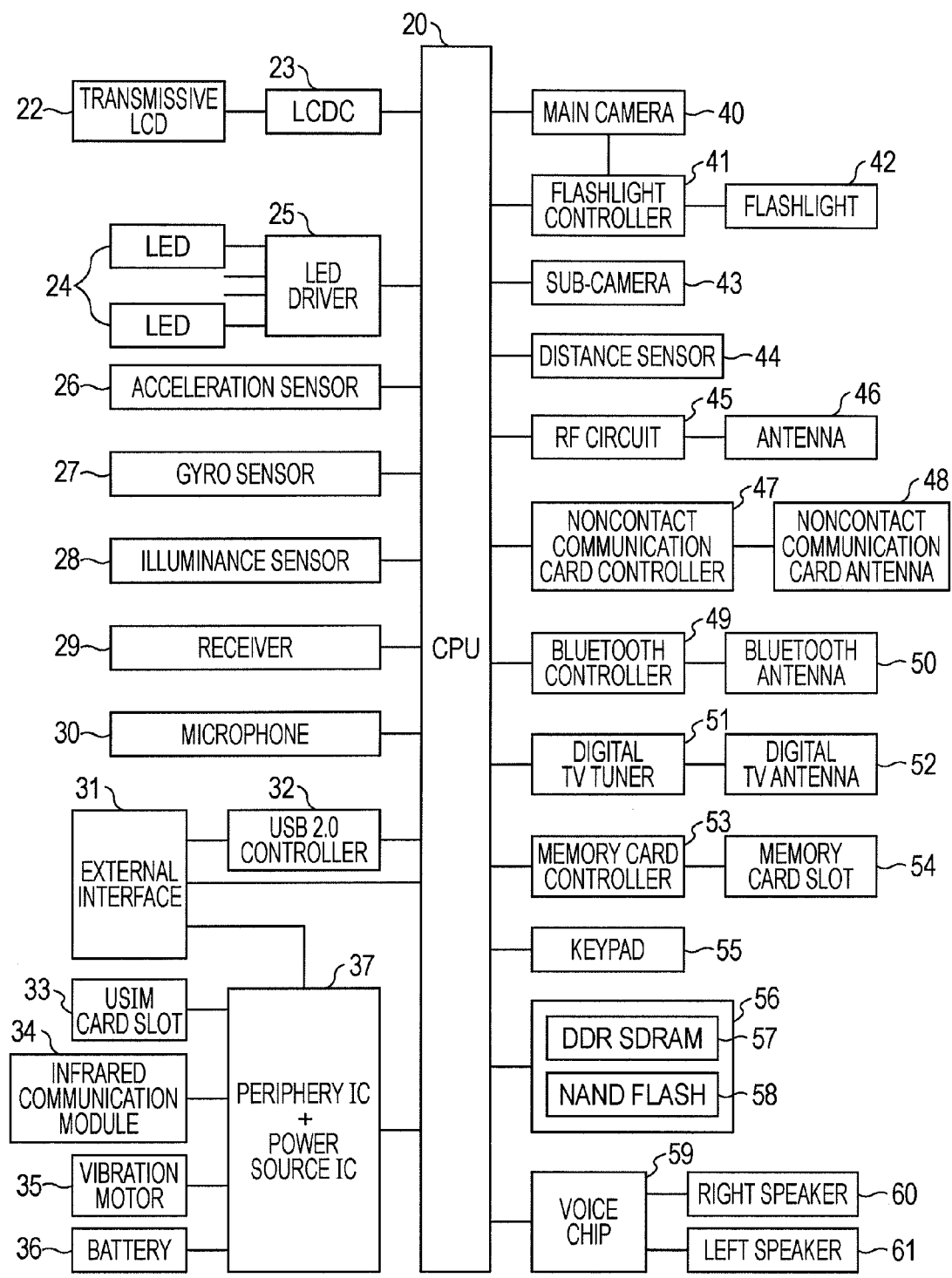
FIG. 11 is a block diagram showing the schematic configuration of the inside of the cellular phone terminal according to an embodiment of the present invention.

FIG. 11 shows the schematic configuration of the inside of the cellular phone terminal 1 according to the embodiment which is capable of being implementing the examples as described above.

In FIG. 11, a transmissive LCD (Liquid Crystal Display) 22 is the above-mentioned transmissive liquid crystal display device 2 according to the embodiment. An LCDC 23 is a liquid crystal display controller that controls an operation and a display and the like of the above-mentioned transmissive LCD 22.

LEDs (light-emitting diode) 24 are various types of illuminating light sources included in the cellular phone terminal according to the embodiment, such as, for example, an incoming lamp or an illuminating lamp of a keypad 55. An LED driver 25 drives and controls these plural LEDs 24.

When physical vibration, for example, is applied to the cellular phone terminal according to the embodiment, an acceleration sensor 26 detects the size and the direction of acceleration of the vibration. A detection signal of this acceleration sensor 26 is sent to a CPU 20.

When physical vibration, for example, is applied to the cellular phone terminal according to the embodiment, a gyro sensor 27 detects the angular velocity and the rotation angle in the rotational direction by this vibration. A detection signal of this gyro sensor 27 is sent to the CPU 20.

An luminance sensor 28 detects brightness of the surrounding environment of the cellular phone terminal according to the embodiment. A detection signal of this luminance sensor 28 is sent to the CPU 20.

When a voice call and the like are performed by the cellular phone terminal according to the embodiment, a receiver 29 (receiver 4 of FIG. 1) is a speaker for outputting the received voice.

When the voice call and the like are performed by the cellular phone terminal according to the embodiment, a microphone 30 (microphone 3 of FIG. 1) is a voice-input device for inputting the sent voice.

An external interface (I/F) 31 is composed of various types of external connectors and external connection portions which perform signaling and the like between the external connectors. Meanwhile, so-called USB 2.0 (Universal Serial Bus 2.0) connectors are included in the external connectors, therefore the cellular phone terminal according to the embodiment include a USB 2.0 controller 32 as well.

A USIM card slot 33 is an IC card slot in which a so-called USIM (Universal Subscriber Identity Module) card having subscriber information (contractor information) and the like stored therein is mounted.

An infrared communication module 34 is a communication device which performs information communication using infrared rays.

A vibration motor 35 is a so-called vibrator which generates vibration at the cellular phone terminal according to the embodiment.

A battery 36 is a power source used in each part of the cellular phone terminal according to the embodiment.

A periphery IC and a power source IC 37 are connected to the USIM card slot 33, the infrared communication module 34, the vibration motor 35, the battery 36, and the external interface 31, and perform control of supplying the power of the battery 36, in addition to control or signal processing of each of these parts.

A main camera 40 is the above-mentioned main camera device, and is composed of photographing optical systems or image capturing elements (image capturing devices) and the like such as camera lenses. A flash (flashlight) 42 is a light source lamp which emits photographing auxiliary light at the time of photographing through the main camera 40. A flashlight controller 41 interlocks with photographing through the main camera 40, to thereby control light-emitting of the flash 42.

A sub-camera 43 is the above-mentioned sub-camera device, and is a camera section provided separately from the main camera 40. As an example, the sub-camera is used for photographing user's self when performing a so-called self-shoot, or is used for photographing user's self when making a call using the TV telephone.

A distance sensor 44 is the above-mentioned distance sensor 5, and is composed of an ultrasonic sensor or a light position sensor.

A RF circuit 45 is a wireless communication circuit when the cellular phone terminal according to the embodiment communicates with a base station of the cellular phone network. An antenna 46 is a wireless communication antenna when the cellular phone terminal according to the embodiment performs wireless communication with the base station.

A noncontact communication card controller 47 performs various types of control and signal processing for performing signal communication with a noncontact communication IC card by a so-called electromagnetic induction manner. A noncontact communication card antenna 48 is an antenna for noncontact communication by the above-mentioned electromagnetic induction manner.

A Bluetooth (registered trademark) controller 49 performs various types of control signal processing for performing wireless communication by a so-called Bluetooth manner. A Bluetooth antenna 50 is an antenna for wireless communication of the above-mentioned Bluetooth manner.

A digital TV tuner 51 is a tuner for so-called digital TV broadcast. A digital TV antenna 52 is an antenna for receiving digital TV broadcast radio waves.

A memory card slot 54 is a slot in which an external memory card such as, for example, a so-called SD (Secure Digital) card is removable. A memory card controller 53 performs control and signal processing such as write/read of data for a memory card loaded into the memory card slot 54.

A key button 55 is the above-mentioned key device portion 7, and is composed of various types of keys and various types of buttons such as a numeric keypad or cross key, and a shutter button mounted in the cellular phone terminal according to the embodiment. The key button generates key button output signals when each of these keys or buttons is operated by a user. In the case of the embodiment, an exclusive shutter button is prepared as one button belonging to the key button 55.

An internal memory 56 includes, for example, a DDR SDRAM (Double Data Rate SDRAM) 57 and an NAND-type flash memory (NAND-type flash memory) 58. In the NAND-type flash memory 58, stored are a program of OS (Operating System), a control program used in order for the CPU 20 to control each part, a control program at the time of photographing according to the invention, various types of application programs including camera application software, various types of setting values, font data, each of dictionary data, model name information or terminal identifying information and the like, in addition to compression coded musical composition/moving image/still image data contents. The DDR SDRAM 57 is a working area when the CPU 20 performs various types of data processing or operation, and stores data at any time.

A voice chip 59 is an IC circuit which performs, for example, signal processing such as music replay. A stereo voice outputting right speaker 60 and a left speaker 61 are connected to the voice chip 59 through an amplifier which is not shown.

the CPU (central processing unit) 20 performs communication control, voice processing and control thereof, image processing and control thereof, camera photographing control, other various types of signal processing or each part control and the like. In addition, the CPU 20 performs execution of various types of control programs or application programs stored in the internal memory 56 and various types of data processing and the like associated with those. Particularly, in the case of the embodiment, the CPU 20 executes a photographing control program according to the invention, so that the CPU performs display control of the transmissive liquid crystal display device 2 as described above, calculation of the distance L from the photographer 70 to the optical finder, zoom control in response to the distance L and the like.

Except for that, although the other things are not shown in FIG. 11, the cellular phone terminal according to the embodiment naturally includes each of the components provided in the general cellular phone terminals.

[Process Flow upon Photographing]

Figure 12:
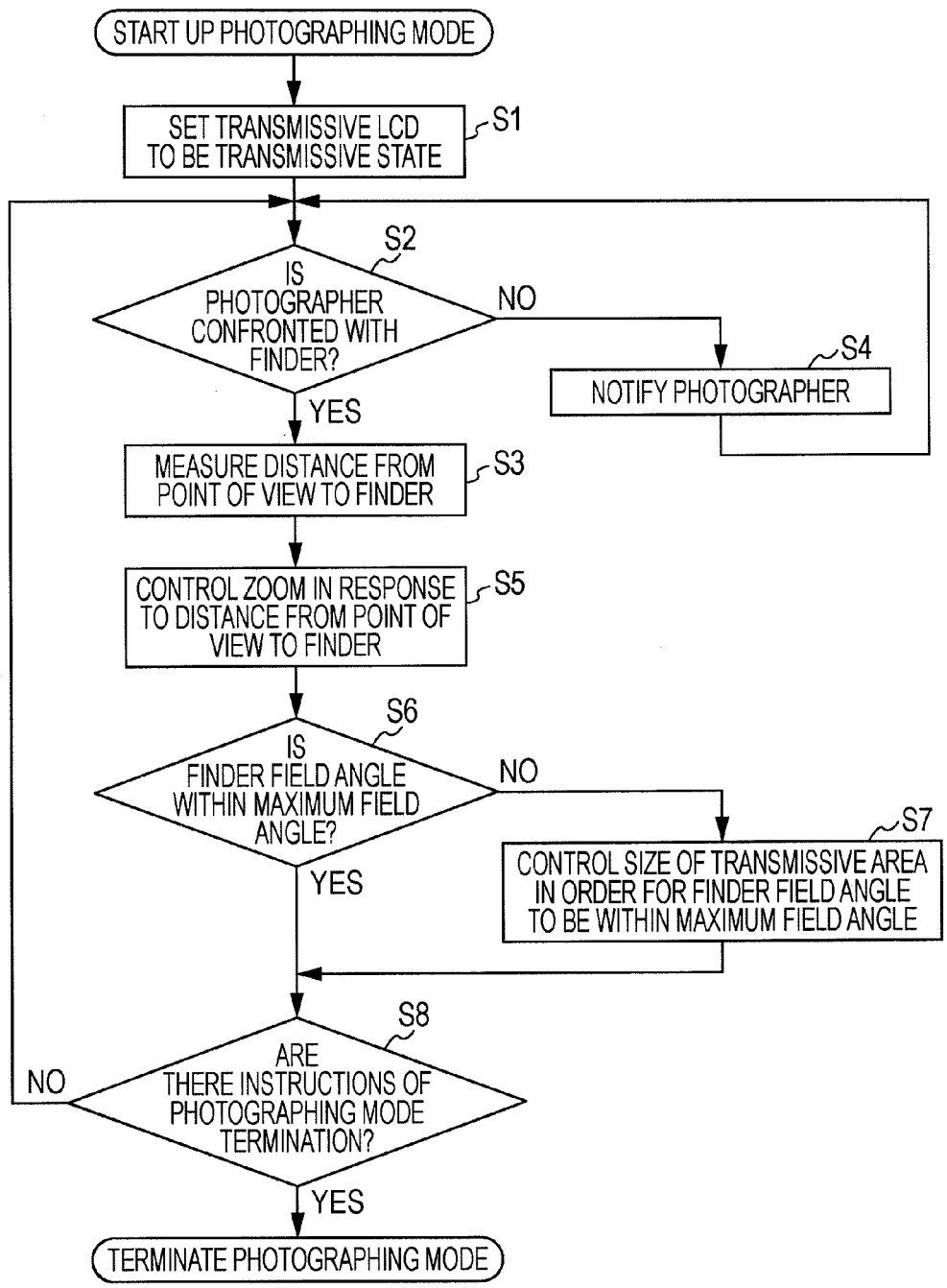
FIG. 12 is a flowchart showing a flow of processing when the cellular phone terminal according to the present embodiment is in photographing mode.

FIG. 12 shows a flow of processing when the cellular phone terminal 1 according to the embodiment is in photographing mode. Processing of the flowchart of FIG. 12 is implemented by execution of the photographing control mode according to the invention by the CPU 20.

In FIG. 12, when the photographing mode is started up, as processing of step S1 the CPU 20 sets the transmissive LCD 22 to be transmissive through the LCDC 23, to thereby make it function as the optical finder.

Next, the CPU 20 advances processing to step S2, and determines whether the photographer is confronted with the finder by, for example, the above-mentioned facial recognition and the like. In the step S2, when it is determined that the photographer is not confronted with the finder, as processing of step S4 the CPU 20 notifies the photographer to be confronted with the finder through sound or display, vibration and the like as mentioned above, and then, returns processing to the step S2. On the other hand, when it is determined that the photographer is confronted with the finder, the CPU 20 advances processing to step S3.

When processing of step S3 is advanced, the CPU 20 obtains the distance from the point of view of the photographer to the finder by, for example, output from the distance sensor 44 or a result of facial authentication.

Next, as processing of step S5 the CPU 20 controls zoom of the main camera 40 in response to the distance from the point of view to the finder.

At this time, as processing of step S6 the CPU 20 determines whether the finder field angle at that point in time is within the maximum field angle. In the step S6, when it is determined that the finder field angle is within the maximum field angle, the CPU 20 advances processing to step S8. On the other hand, when it is determined that the finder field angle exceeds the maximum field angle, the CPU 20 advances processing to step S7, controls the size of the transmissive area of the transmissive LCD 22 so as for the finder field angle to be within the maximum field angle, and then advances processing to step S8.

When processing of step S8 is advanced, the CPU 20 determines whether instructions of photographing mode termination is performed from the photographer through, for example, the key button 55. When instructions of the photographing mode termination is not yet input, the CPU returns processing to step S2, and when instructions of the photographing mode termination is input, the CPU terminates processing of the flowchart of FIG. 12.

Processing Flow of Automatic Zoom Mode and Manual Zoom Mode

The flowchart of FIG. 12 as described above shows a processing flow when an automatic zoom mode is performed in the photographing mode. However, when switching of an automatic zoom mode and a manual zoom mode is performed, a step of mode switching selection (step S20) is inserted in, for example, the former step of step S1 as shown in a flowchart of FIG. 13. Meanwhile, in FIG. 13, the same reference marks are attached to the same steps as those of FIG. 12, and the descriptions thereof will be omitted.

Figure 13:
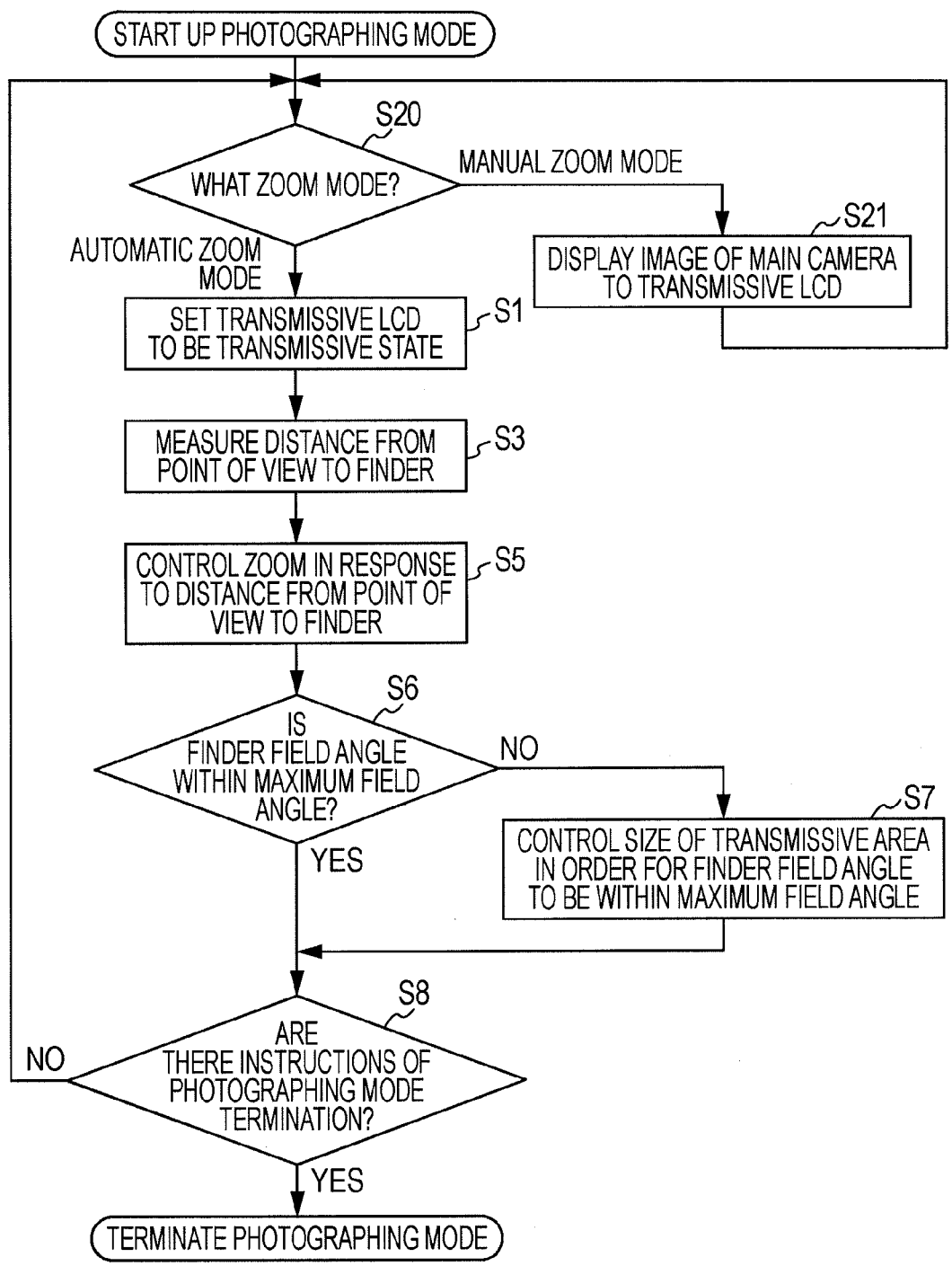
FIG. 13 is a flowchart including processing when switching of an automatic zoom mode and a manual zoom mode is performed in the case where the cellular phone terminal according to the present embodiment is in photographing mode.

In FIG. 13, when the photographing mode is started up, as processing of step S20 the CPU 20 determine which one of the automatic zoom mode or the manual zoom mode the zoom mode is set to be. Determination in this step S20 is performed by on whether the photographer is confronted with the finder by the face authentication as mentioned above, or by which mode the zoom mode is set to be by the menu selection. For example, with the zoom mode automatically selected in response to a result of the face authentication by the menu selection and the like, when it is determined that the photographer is confronted with the finder by the face authentication, the CPU 20 switches the zoom mode to the automatic zoom mode to advance processing to step S1. On the other hand, when it is determined that the photographer is not confronted with the finder by the face authentication, the CPU switches the zoom mode to the manual zoom mode to advance processing to step S21. In addition, for example, when the zoom mode is not previously set to be the automatic zoom mode by the menu selection, the CPU 20 advances processing to step S1. On the other hand, when the zoom mode is not previously set to be the manual zoom mode by the menu selection, the CPU advances processing to step S21.

When processing of step S21 is advanced, the CPU 20 displays an image from the main camera 40 on the transmissive LCD 22. At this time, when zoom instructions are input from the photographer through the key operation, the CPU 20 controls zooming of the main camera 40 in accordance with the zoom instructions. After that, the CPU 20 returns processing to step S20.

In the case of the flowchart of FIG. 13, when it is determined that instructions of photographing mode termination are not yet input from the photographer in step S8, the CPU 20 returns processing to step S20.

Processing Flow upon Photographing

Figure 14:
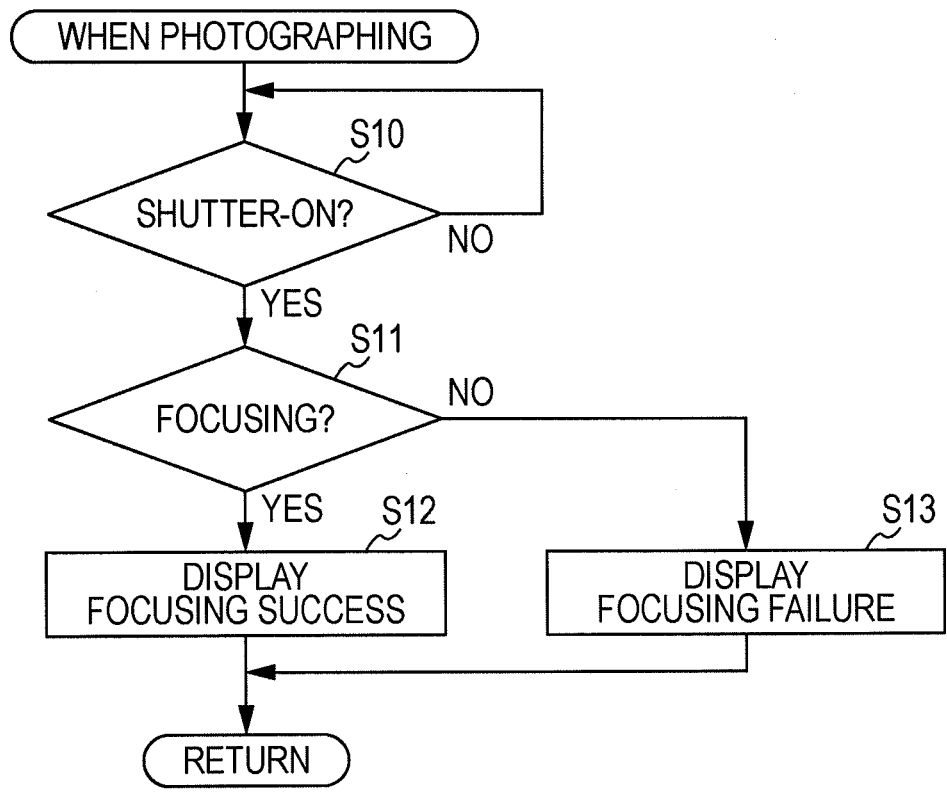
FIG. 14 is a flowchart showing a processing flow, particularly, processing in cases of focusing success/focusing failure when photographing is actually performed in the case where the cellular phone terminal according to the present embodiment is in photographing mode.

FIG. 14 shows a processing flow when photographing is performed with the shutter button on, in the case where the cellular phone terminal according to the embodiment is in photographing mode. In addition, a flowchart of FIG. 14 shows only a processing flow of step portions associated with, in particular, focusing display at the time of focusing success (in focus) and focusing failure display at the time of focusing failure (out of focus) among a series of processing upon photographing. Therefore, general processing flows other than a flow at the time of photographing, for example, such as storage of photographed data are omitted in the flowchart of FIG. 14.

In FIG. 14, when photographing is possible, as processing of step S10 the CPU 20 monitors whether the shutter button 10 is on-state. If the shutter button 10 is on-state, the CPU 20 advances processing to step S11.

When processing of step S11 is advanced, the CPU 20 determines whether the focus is taken at the time of photographing through the main camera 40. When determining focusing success in the step S11, as processing of step S12 the CPU 20 performs focusing success display as in, for example, above-mentioned FIG. 10. On the other hand, when determining focusing failure in step S11, as processing of step S13 the CPU 20 performs focusing failure display as in, for example, above-mentioned FIG. 9.

After processing of these step S12 and step S13, the CPU 20 returns it to processing for performing the next photographing processing.

Conclusion

As described above, in the camera-equipped cellular phone terminal according to the embodiment, since the transmissive liquid crystal display device 2 is used as an optical finder, power consumption can be suppressed in photographing mode, and the photographer can perform photographing while confirming an entity of the real world directly without involving higher costs or increased size. In addition, with the camera-equipped cellular phone terminal according to the embodiment, it is possible for the photographer to positively determine the photographing field angle without any erroneous operation by controlling zooming automatically in response to the distance from the photographer to the optical finder.

The present application contains subject matter related to that disclosed in Japanese Priority Patent Application JP 2009-025434 filed in the Japan Patent Office on Feb. 5, 2009, the entire content of which is hereby incorporated by reference.

Meanwhile, the description of the above-mentioned embodiments is an example of the present invention. Therefore, the present invention is not limited to each of the above-mentioned embodiments, and may of course allow various modifications in accordance with the design and the like, within the scope not to departing from the technical spirit according to the present invention. For example, although the present invention has been described by an example of the cellular phone terminal in the above-mentioned embodiments, the present invention may also be applied to digital cameras or other terminals if they include the transmissive liquid crystal display device.

What is claimed is:

1. An image photographing apparatus comprising:
    a camera section having a zoom function for changing a photographing field angle;
    a transmissive display section including a display surface that allows sides facing each other to be transmissively viewed from both directions of a housing front side and a housing back side;
    a distance detection section that detects a distance from a point of view of a photographer to the display surface of the display section; and
    a control section that controls the display surface of the transmissive display section in a transmissively viewable state when in photographing mode so as to perform photographing by the camera section, and determines a photographing field angle using the zoom function of the camera section in response to the distance detected by the distance detection section,
    wherein the camera section includes a main camera device used in the photographing mode and a sub camera device used to photograph the photographer during a call between the photographer and another calling party.

2. The image photographing apparatus according to claim 1,
    wherein the control section calculates a viewing angle passing through the display surface in a transmissively viewable state from the point of view of the photographer by a diagonal angle of view of the display surface in a transmissively viewable state, and the distance detected by the distance detection section, and matches the photographing field angle using the zoom function of the camera section with the viewing angle.

3. The image photographing apparatus according to claim 2,
    wherein when the calculated viewing angle exceeds a maximum photographing field angle using the zoom function of the camera section, the control section controls the size of the display surface in a transmissively viewable state so that the calculated viewing angle is matched with the maximum photographing field angle.

4. The image photographing apparatus according to claim 1,
    wherein the control section controls an aspect ratio of the display surface in a transmissively viewable state so as to be matched with an aspect ratio of an image photographed by the camera section.

5. The image photographing apparatus according to claim 1,
    wherein when the focus is not taken at the time of image photographing by the camera section, the control section controls transmittance of the display surface in a transmissively viewable state so as to be lowered.

6. The image photographing apparatus according to claim 1,
wherein when the focus is taken at the time of image photographing by the camera section, the control section displays a predetermined focused image on the display surface in a transmissively viewable state.

7. The image photographing apparatus according to claim 1,
wherein the distance detection section detects the distance by measuring an incidence angle or arrival time of a reflected wave that a predetermined radiation wave is reflected from an object.

8. An image photographing apparatus comprising;
a camera section having a zoom function for changing a photographing field angle;
a transmissive display section including a display surface that allows sides facing each other to be transmissively viewed from both directions of a housing front side and a housing back side;
a distance detection section that detects a distance from a point of view of a photographer to the display surface of the display section; and
a control section that controls the display surface of the transmissive display section in a transmissively viewable state when in photographing mode so as to perform photographing by the camera section, and determines a photographing field angle using the zoom function of the camera section in response to the distance detected by the distance detection section,
wherein the distance detection section recognizes a facial image obtained by photographing the face of the photographer, and calculates the distance from the size of the recognized facial image.

9. The image photographing apparatus according to claim 1,
wherein the transmissive display section is constituted by a transmissive liquid crystal display device,
the transmissive liquid crystal display device including a structure where a large number of liquid crystal molecules are interposed between two sheets of transparent plates,
one of the two sheets of transparent plates, in the transmissive liquid crystal display device, being disposed in the housing front side and the other in the housing back side so as to be in sight from the outside, and
the transmissive liquid crystal display device being capable of controlling orientation of axes of the liquid crystal molecules in a direction of light scattering, and in a direction in which light is transmitted to both the housing front side and the housing back side.

10. A method of controlling an image photographing apparatus comprising the steps of:
causing a control section to start up photographing mode in which photographing is performed by a camera section having a zoom function of changing a photographing field angle;
causing the control section to control, when the photographing mode is started up, a transmissive display section having a display surface that allows sides facing each other to be transmissively viewed from both directions of a housing front side and a housing back side, to thereby set the display surface to be in a transmissively viewable state;
causing a distance detection section to detect a distance from a point of view of a photographer to the display surface of the display section at the time of the photographing mode; and
causing the distance detection section to recognize a facial image obtained by photographing the face of the photographer and calculate the distance from the size of the recognized facial image; and
causing the control section to determine a photographing field angle using a zoom function of the camera section in response to the distance detected by the distance detection section at the time of the photographing mode.

11. A storage medium storing a control program causing an image photographing apparatus to execute the processes of:
starting up photographing mode in which photographing is performed by a camera section having a zoom function of changing a photographing field angle;
controlling, when the photographing mode is started up, a transmissive display section having a display surface that allows sides facing each other to be transmissively viewed from both directions of a housing front side and a housing back side, to thereby set the display surface to be in a transmissively viewable state;
detecting a distance from a point of view of a photographer to the display surface of the display section by a distance detection section at the time of the photographing mode; and
causing the distance detection section to recognize a facial image obtained by photographing the face of the photographer and calculate the distance from the size of the recognized facial image; and
determining a photographing field angle using a zoom function of the camera section in response to the distance detected by the distance detection section at the time of the photographing mode.

* * * * *